(12) United States Patent
Mallari et al.

(10) Patent No.: US 7,118,822 B2
(45) Date of Patent: *Oct. 10, 2006

(54) FUEL CELL ELECTRODE PAIR ASSEMBLIES AND RELATED METHODS

(75) Inventors: Jonathan C. Mallari, Seattle, WA (US); Suzanne M. Snyder, Shoreline, WA (US); Vinh Chung, Bellevue, WA (US); Slobodan Petrovic, Kirkland, WA (US)

(73) Assignee: Neah Power Systems, Inc., Bothell, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/893,424

(22) Filed: Jul. 16, 2004

(65) Prior Publication Data

US 2005/0003263 A1    Jan. 6, 2005

Related U.S. Application Data

(63) Continuation of application No. 10/147,135, filed on May 15, 2002, now Pat. No. 6,811,916.

(60) Provisional application No. 60/291,202, filed on May 15, 2001.

(51) Int. Cl.
*H01M 2/08* (2006.01)
*H01M 8/02* (2006.01)
*H01M 4/86* (2006.01)

(52) U.S. Cl. ......................... 429/36; 429/44

(58) Field of Classification Search .................. 429/35, 429/36, 42, 44, 45

See application file for complete search history.

(56) References Cited

U.S. PATENT DOCUMENTS 6,497,975 B1 * 12/2002 Bostaph et al. ........... 429/44 X
6,541,149 B1 * 4/2003 Maynard et al. .......... 429/44 X
6,641,948 B1 * 11/2003 Ohlsen et al. ................ 429/44
6,720,105 B1 * 4/2004 Ohlsen et al. ............ 429/44 X
6,808,840 B1 * 10/2004 Mallari et al. ................ 429/44
6,811,916 B1 * 11/2004 Mallari et al. ................ 429/36
6,896,992 B1 * 5/2005 Kearl .......................... 429/44

* cited by examiner

*Primary Examiner*—Stephen J Kalafut
(74) *Attorney, Agent, or Firm*—Thomas E. Loop

(57) ABSTRACT

Disclosed herein are fuel cell systems and, more specifically, fuel cell electrode pair and stack assemblies and various methods relating thereto. In one embodiment, the present invention is directed to a fuel cell electrode pair assembly adapted for use with a fuel cell system, wherein the electrode pair assembly comprises an anode structure derived from a first silicon substrate and an opposing cathode structure derived from a second silicon substrate, wherein at least (i) the anode structure comprises one or more discrete anodic porous active regions disposed across a top surface, or (ii) the cathode structure comprises one or more discrete cathodic porous active regions disposed across a top surface, and wherein the anode structure and the cathode structure each have at least one adjoining support member made of silicon, one or more plastics, or one or more glasses, and wherein the at least one adjoining support member of the anode structure and the at least one adjoining support member of the cathode structure have interfacing surfaces that are bonded together with an optional interposing binding material and with at least one selectively positioned bond to thereby form a hermetic seal, wherein the at least one selectively positioned bond is selected from the group consisting of a silicon-metal eutectic-silicon bond, a silicon-frit-silicon bond, a silicon-metal-silicon microwave bond, a silicon-polymer adhesive-silicon bond, a silicon-polymer adhesive-plastic bond, a silicon-polymer adhesive-glass bond, or a silicon-glass anodic bond.

12 Claims, 4 Drawing Sheets

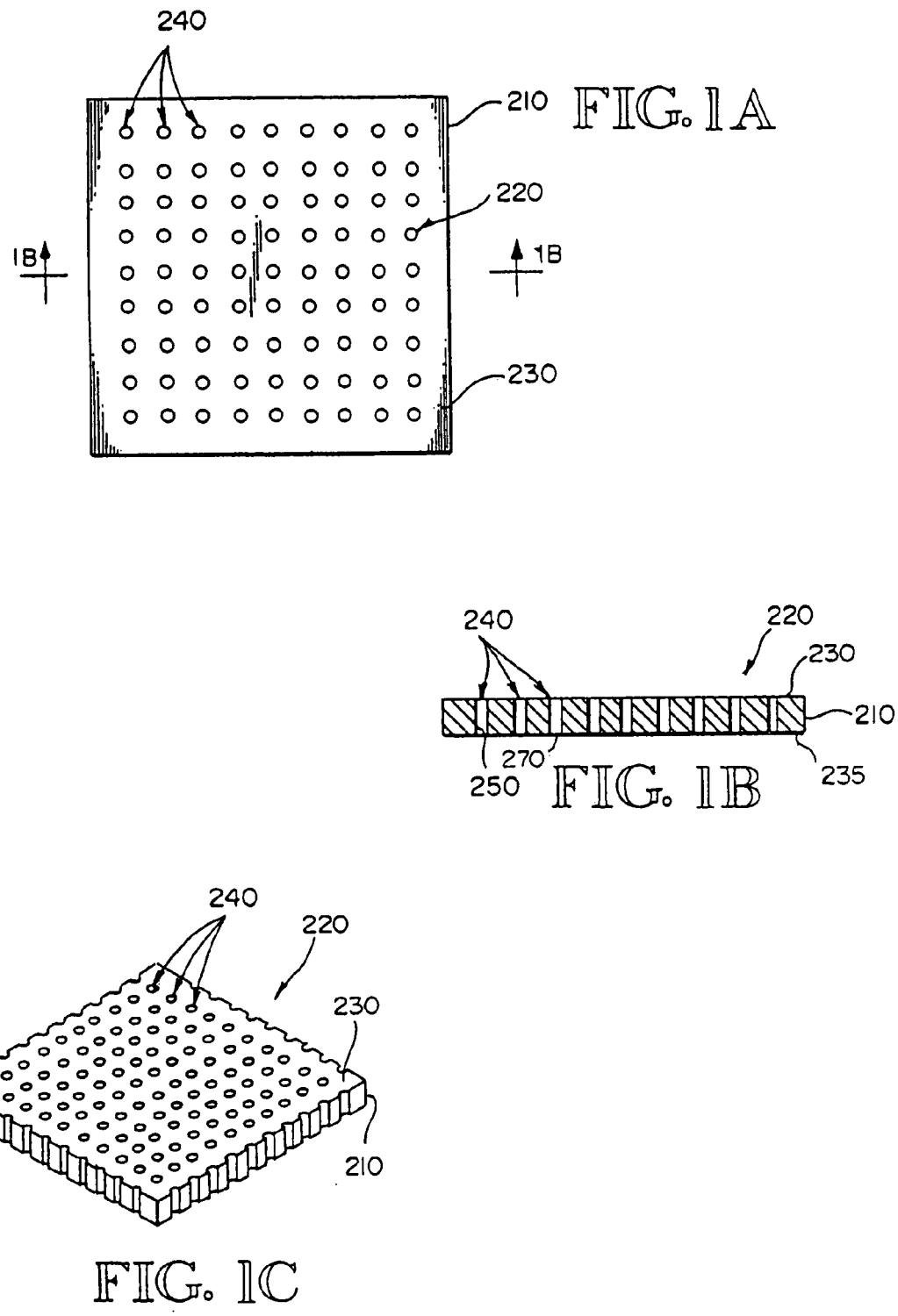

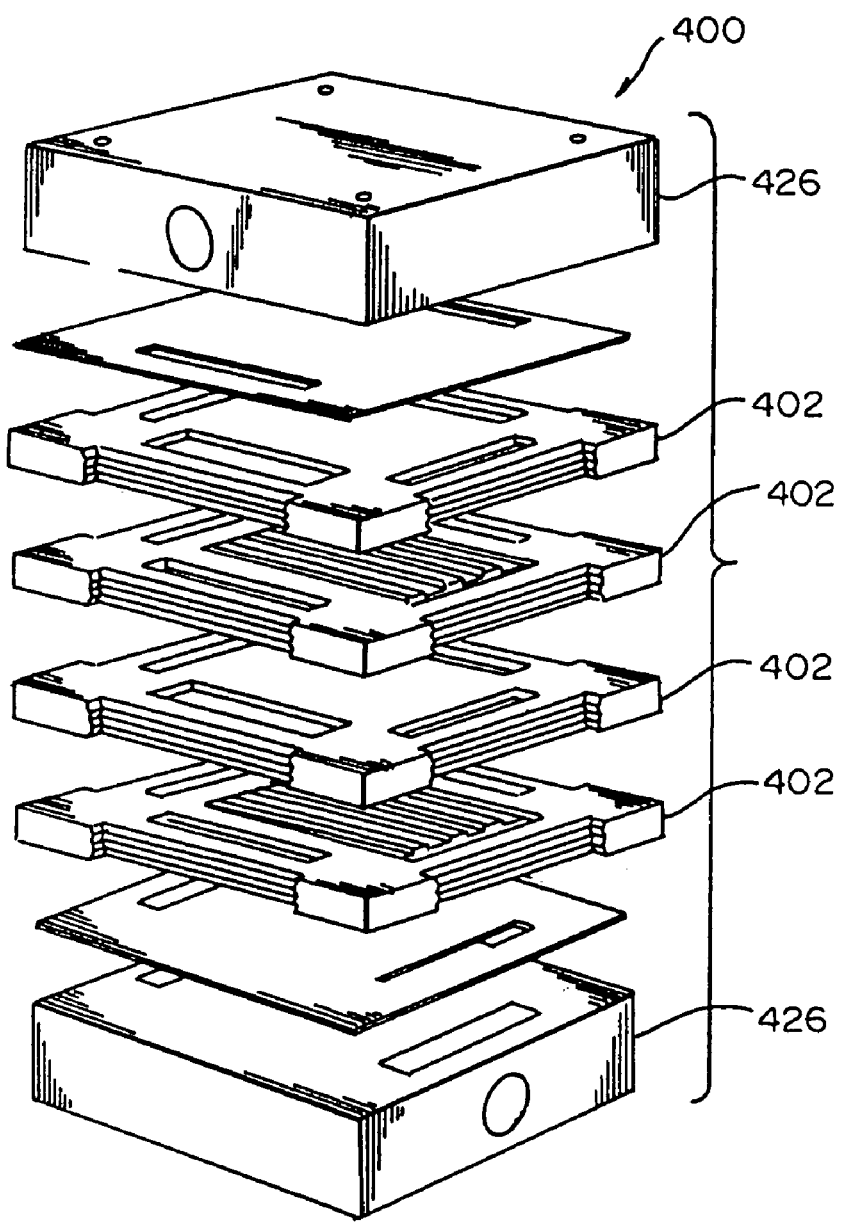

FUEL CELL ELECTRODE PAIR ASSEMBLIES AND RELATED METHODS

CROSS-REFERENCE TO RELATED APPLICATION

This continuation application claims priority to U.S. application Ser. No. 10/147,135 filed on May 15, 2002, now U.S. Pat. No. 6,811,916, which application claims the benefit of U.S. Provisional Application No. 60/291,202 filed May 15, 2001, both of which are incorporated herein by reference in there entireties.

TECHNICAL FIELD

The present invention relates generally to fuel cell systems and, more specifically, to fuel cell electrode pair and stack assemblies and various methods relating thereto.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or a hydrocarbon (e.g., methanol), to electrical power through an electrochemical process rather than combustion. It does so by harnessing the electrons released from controlled oxidation-reduction reactions occurring on the surface of a catalyst. A fuel cell can produce electricity continuously so long as fuel is supplied from an outside source.

In electrochemical fuel cells employing methanol as the fuel supplied to the anode (also commonly referred to as a "Direct Methanol Fuel Cell (DMFC)" system), the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air (supplied to the cathode) is likewise simultaneously reduced at the cathode. The ions (protons) formed at the anode migrate through the interposing electrolyte and combine with the oxygen at the cathode to form water. From a molecular perspective, the electrochemical reactions occurring within a direct methanol fuel cell (DMFC) system are as follows:

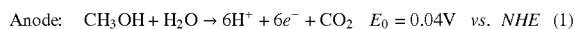
Anode: $CH_3OH + H_2O \rightarrow 6H^+ + 6e^- + CO_2 \quad E_0 = 0.04V \text{ vs. } NHE$ (1)

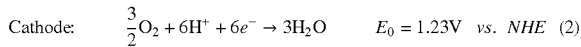
Cathode: $\frac{3}{2}O_2 + 6H^+ + 6e^- \rightarrow 3H_2O \quad E_0 = 1.23V \text{ vs. } NHE$ (2)

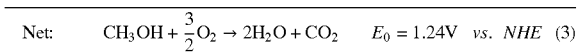
Net: $CH_3OH + \frac{3}{2}O_2 \rightarrow 2H_2O + CO_2 \quad E_0 = 1.24V \text{ vs. } NHE$ (3)

The various electrochemical reactions associated with other state-of-the-art fuel cell systems (e.g., hydrogen or carbonaceous fuel) are likewise well known to those skilled in the art of fuel cell technologies.

With respect to state-of-the-art fuel cell systems generally, several different configurations and structures have been contemplated—most of which are still undergoing further research and development. In this regard, existing fuel cell systems are typically classified based on one or more criteria, such as, for example: (1) the type of fuel and/or oxidant used by the system, (2) the type of electrolyte used in the electrode stack assembly, (3) the steady-state operating temperature of the electrode stack assembly, (4) whether the fuel is processed outside (external reforming) or inside (internal reforming) the electrode stack assembly, and (5) whether the reactants are fed to the cells by internal manifolds (direct feed) or external manifolds (indirect feed). In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:

1. Alkaline fuel cells (e.g., KOH electrolyte);
2. Acid fuel cells (e.g., phosphoric acid electrolyte);
3. Molten carbonate fuel cells (e.g., $Li_2CO_3/K_2CO_3$ electrolyte);
4. Solid oxide fuel cells (e.g., yttria-stabilized zirconia electrolyte);
5. Proton exchange membrane fuel cells (e.g., NAFION electrolyte).

Although these state-of-the-art fuel cell systems are known to have many diverse structural and operational characteristics, such systems nevertheless share many common characteristics with respect to the joining or bonding together of the individual electrode structures that form the electrode stack assembly. Put simply, most conventional state-of-the-art electrode stack assemblies consist essentially of a series of conjoined anode and cathode structures, wherein the faces of the electrode structures (together with any separator and fluid flow plates) are adjacently positioned next to one another and attached together by means of adhesives and/or bolted tie rods. Moreover, most conventional fuel cell stack assemblies also include a plurality of fluid tight resilient seals, such as elastomeric gaskets. The use of such elastomeric gaskets (together with the disparate materials used for the separator and fluid flow plates) necessitates the need to have a constant compressive force applied along the longitudinal axis of the stack assembly to ensure resilient sealing. Hence, and in order to maintain proper sealing between adjacent surfaces, conventional fuel cell stacks are generally compressed together by one or more metal tie rods or tension members. In general, the end bolted tie rods or tension members of such conventional state-of-the-art stack assemblies extend through holes formed in stack's end plates; in this configuration a constant compressive force is maintained throughout the stack assembly. In addition, adhesives such as, for example, epoxides are often also applied between the various opposing faces of the stack components to ensure that the stack is hermetically sealed.

Exemplary fuel cell electrode stack assemblies in accordance with the prior art are disclosed in U.S. Pat. No. 5,723,228 to Okamoto (discloses DMFC system having a series of bolted together membrane electrode assemblies with interposing gaskets and separator plates), (2) U.S. Pat. No. 6,190,793 B1 to Barton et al. (discloses a fuel cell stack assembly having non-conductive tie rod tension members); and (3) U.S. Pat. No. 6,057,053 to Gibb (discloses compression assembly for a fuel cell stack). A significant problem associated with these conventional fuel cell stack designs, however, is their limited ability to be scaled down so as to be manufacturable on a micro-scale basis. In particular, these conventional fuel cell stack designs are not generally amenable to the "stacking" of silicon and/or sol-gel derived electrode structures (which electrode structures are generally made by micro-fabrication techniques and are associated with micro-scale fuel cell systems). Accordingly, there is still a need in the art for improved fuel cell electrode stack assemblies, systems, and related methods. The present invention fulfills these needs and provides for further related advantages.

SUMMARY OF THE INVENTION

In brief, the present invention relates generally to fuel cell systems and, more specifically, to fuel cell electrode pair and stack assemblies and various methods relating thereto. In one embodiment, the present invention is directed to a fuel cell electrode pair assembly adapted for use with a fuel cell system, wherein the electrode pair assembly comprises an anode structure derived from a first silicon substrate and an opposing cathode structure derived from a second silicon substrate, wherein at least (i) the anode structure comprises one or more discrete anodic porous active regions disposed across a top surface, or (ii) the cathode structure comprises one or more discrete cathodic porous active regions disposed across a top surface, and wherein the anode structure and the cathode structure each have at least one adjoining support member made of silicon, one or more plastics, or one or more glasses, and wherein the at least one adjoining support member of the anode structure and the at least one adjoining support member of the cathode structure have interfacing surfaces that are bonded together with an optional interposing binding material and with at least one selectively positioned bond to thereby form a hermetic seal, wherein the at least one selectively positioned bond is selected from the group consisting of a silicon-metal eutectic-silicon bond, a silicon-frit-silicon bond, a silicon-metal-silicon microwave bond, a silicon-polymer adhesive-silicon bond, a silicon-polymer adhesive-plastic bond, a silicon-polymer adhesive-glass bond, or a silicon-glass anodic bond.

In some embodiments, the at least one adjoining support member of the anode structure or the at least one adjoining support member of the cathode structure is made of silicon that is integral to the anode structure or the cathode structure. In other embodiments the at least one adjoining support member of the anode structure and the at least one adjoining support member of the cathode structure are both made of silicon, and wherein the optional binding material is a metal, and wherein the at least one selectively positioned bond is the silicon-metal eutectic-silicon bond. Preferably, however, the metal is gold, tin, lead, copper, silver, aluminum, or a combination thereof, and more preferably the metal is gold. In addition, the fuel cell electrode pair assembly may further comprise (i) a dielectric layer on at least one of the interfacing surfaces, wherein the dielectric layer comprises silicon dioxide, silicon nitride, or a combination thereof, and (ii) an adhesion layer on the dielectric layer, wherein the adhesion layer comprises titanium, chromium, tungsten, aluminum, or a combination thereof. Preferably, however, the adhesion layer is a titanium-tungsten layer.

In other embodiments, the at least one adjoining support member of the anode structure and the at least one adjoining support member of the cathode structure are both made of silicon, and wherein the optional binding material is a frit, and wherein the at least one selectively positioned bond is the silicon-frit-silicon bond. Preferably, however, the frit comprises a silicate. In addition, the fuel cell electrode pair assembly may further comprise a dielectric layer on at least one of the interfacing surfaces, wherein the dielectric layer comprises silicon dioxide, silicon nitride, or a combination thereof.

In still other embodiments, the at least one adjoining support member of the anode structure and the at least one adjoining support member of the cathode structure are both made of silicon, and wherein the optional binding material is a metal, and wherein the at least one selectively positioned bond is the silicon-metal-silicon microwave bond. Preferably, however, the metal is gold, tin, lead, copper, silver, aluminum, or a combination thereof, and more preferably the metal is gold. In addition, the fuel cell electrode pair assembly may further comprise (i) a dielectric layer on at least one of the interfacing surfaces, wherein the dielectric layer comprises silicon dioxide, silicon nitride, or a combination thereof, and (ii) an adhesion layer on the dielectric layer, wherein the adhesion layer comprises titanium, chromium, tungsten, aluminum, or a combination thereof. Preferably, however, the adhesion layer is a titanium-tungsten layer.

In still further embodiments, the at least one adjoining support member of the anode structure and the at least one adjoining support member of the cathode structure are both made of silicon, and wherein the anode structure and the cathode structure are made of different materials, and wherein the optional binding material comprises a polymer adhesive, and wherein the at least one selectively positioned bond is the silicon-polymer adhesive-silicon bond. In these embodiments, the polymer adhesive may comprise one or more amorphous fluoropolymers, benzocyclobutane, polydimethylsiloxane, perfluoro 2,2-dimethyl-1,3-dioxole, tetrafluoroethylene, or a combination thereof.

In still further embodiments, the at least one adjoining support member of the anode structure and the at least one adjoining support member of the cathode structure are each made of silicon or the one or more plastics, and wherein the anode structure and the cathode structure are made of different materials, and wherein the optional binding material comprises a polymer adhesive, and wherein the at least one selectively positioned bond is the silicon-polymer adhesive-plastic bond. In these embodiments, the one or more plastics are each independently selected from the group consisting of siloxanes, epoxies, polyimides, polyphenylene ethers, polyphenylene sulfides, polysufones, or fluoropolymers; and the polymer adhesive may comprise one or more amorphous fluoropolymers, benzocyclobutane, polydimethylsiloxane, perfluoro 2,2-dimethyl-1,3-dioxole, tetrafluoroethylene, or a combination thereof.

In still further embodiments, the at least one adjoining support member of the anode structure and the at least one adjoining support member of the cathode structure are each made of silicon or the one or more glasses, and wherein the anode structure and the cathode structure are made of different materials, and wherein the optional binding material comprises a polymer adhesive, and wherein the at least one selectively positioned bond is the silicon-polymer adhesive-glass bond. In these embodiments, the one or more glasses may comprise a borosilicate glass. In addition, the polymer adhesive may comprise one or more amorphous fluoropolymers, benzocyclobutane, polydimethylsiloxane, perfluoro 2,2-dimethyl-1,3-dioxole, tetrafluoroethylene, or a combination thereof.

In still further embodiments, the at least one adjoining support member of the anode structure and the at least one adjoining support member of the cathode structure are each made of silicon or the one or more glasses, and wherein the anode structure and the cathode structure are made of different materials, and wherein the at least one selectively positioned bond is the silicon-glass anodic bond. In these embodiments, the one or more glasses may comprise a borosilicate glass.

These and other aspects of the present invention will become more evident upon reference to the following detailed description and attached drawings. It is to be understood, however, that various changes, alterations, and substitutions may be made to the specific fuel cell electrode structures disclosed herein without departing from the essential spirit and scope of the present invention. In addition, it is to be further understood that the drawings are illustrative and symbolic representations of exemplary embodiments of the present invention (hence, they are not necessarily to scale). Finally, it is expressly provided that all of the various references cited herein are incorporated by reference in their entireties.

BRIEF DESCRIPTION OF THE DRAWINGS

FIG. 1A illustrates a top plan view of an electrode structure having a plurality of acicular pores in accordance with an embodiment of the present invention.

FIG. 1B illustrates a cross-sectional view of the electrode structure of FIG. 1A, wherein the view is taken along line B—B of FIG. 1A.

FIG. 1C illustrates a top perspective view of the electrode structure of FIGS. 1A and 1B.

FIG. 4 illustrates an exploded perspective view of an exemplary fuel cell electrode stack assembly in accordance with an embodiment of the present invention.

DETAILED DESCRIPTION OF THE INVENTION

Figure 2A:
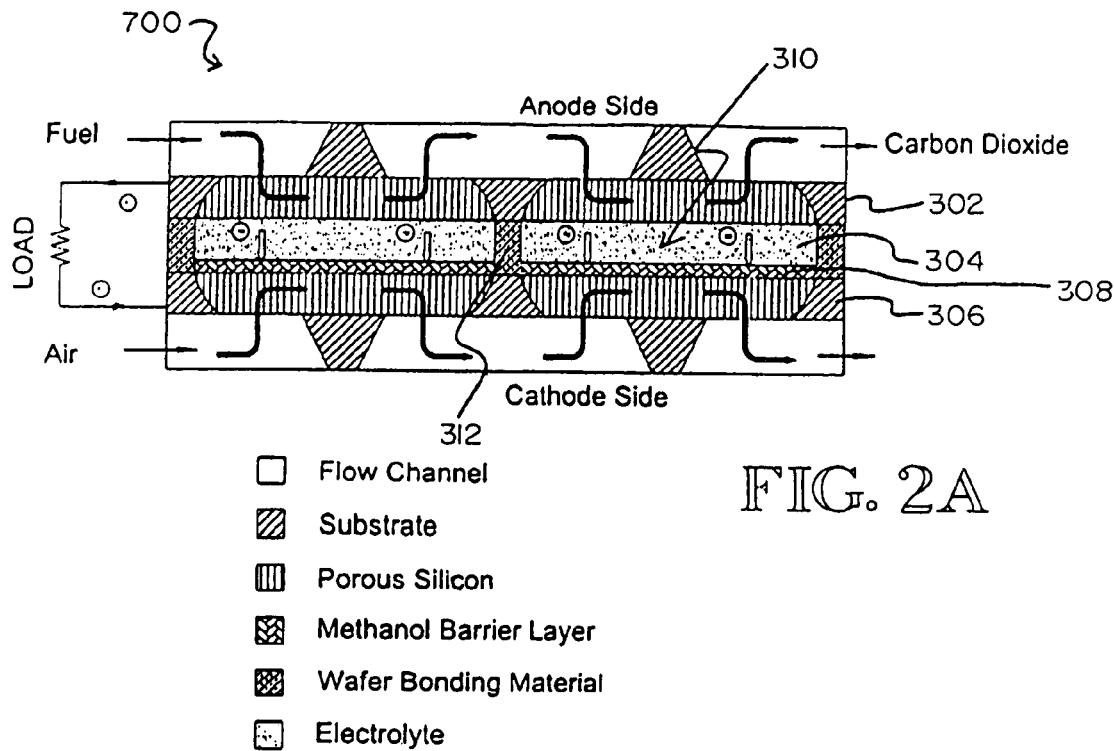
FIG. 2A illustrates a cross-sectional view of an exemplary electrode assembly in accordance with an embodiment of the present invention, wherein a planar anode and a planar cathode have porous silicon substrate regions, and wherein the planar anode and the planar cathode are attached to each other by a plurality of bridge members that span across a spaced apart region.

The present invention relates generally to fuel cell systems and, more specifically, to fuel cell electrode pair and stack assemblies and various methods relating thereto. As is appreciated by those skilled in the art, a fuel cell system generally comprises a stack of electrode pair assemblies (referred to as an electrode stack assembly), wherein each individual electrode pair assembly consists essentially of two opposing electrode structures, an anode and a cathode, ionically connected together via an interposing electrolyte. The electrode stack assembly of such fuel cell systems also generally includes a series of flow channels for flowing reactant streams adjacent to and/or through discrete regions of the electrode structures In the several embodiments set forth herein, the inventive fuel cell electrode pair and stack assemblies are based, in large part, on novel electrode structures that are particularly useful for carrying a catalyst, wherein the catalyst is readily accessible to flowing gaseous and/or liquid reactant streams. In this regard, electrode structures useful for practicing the present invention principally include those made from silicon substrates such as, for example, silicon wafers. In particular, it has been discovered that electrode structures made from silicon wafers are particularly useful in miniature fuel cell systems (especially micro-scale direct methanol fuel cell systems), mainly because such electrode structures are able to provide a high surface area to bulk volume ratio, have good mechanical strength, and are compatible with various thin/thick films which are often needed for making selected electrical connections. Because of these physical characteristic, among others, the electrode pair and stack assemblies of the present invention are capable of delivering reliable power.

Accordingly, and without limitation to any particular methodology, the individual silicon electrode structures of the present invention may be made out of silicon wafers by utilizing standard microelectronic processes such as, for example, alkaline etching, plasma etching, lithography, electroplating, as well as electrochemical pore formation. In this way, a silicon substrate useful for carrying a catalyst may be produced, wherein the silicon substrate may have any number of pores and pores sizes such as, for example, random or ordered pore arrays—including pore arrays having selected pore diameters, depths, and distances relative to one another. In short, the silicon electrode structures of the present invention may have any number of possible porosities and/or void spaces associated therewith.

An exemplary embodiment of a porous silicon electrode structure useful as a component of the present invention is shown in FIGS. 1A–C, which drawings show an isolated electrode structure (which structure is adapted for use with a fuel cell system). The electrode structure of this embodiment comprises a silicon substrate 210 (thickness ranging from about 300 to about 500 microns) having one or more discrete porous regions 220 disposed across a top surface 230 of the substrate 210. In addition, each of the one or more discrete porous regions 220 is defined by a plurality of acicular or columnar pores 240 that extend through the substrate 210 (diameter ranging from about 0.5 to about 10 microns). The plurality of acicular or columnar pores define inner pore surfaces 250, and the inner pore surfaces 250 may have an optional conformal electrically conductive layer 270 thereon. In some embodiments and as shown, the pores are substantially perpendicular to the top and bottom surfaces 230, 235 of the substrate 210. In some other embodiments, the pores each have a diameter of about 10 microns and are spaced apart from one another about 10 microns (from pore center axis to adjacent pore center axis) so as to yield substrate having an approximate 39% porosity.

Porous silicon electrode structures useful in the context of the present invention may be formed by silicon micromachining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching; this technique has been used in the semiconductor industry for wafer thinning, polishing, and the manufacture of thick porous silicon films. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.*, 11(12):588–589 (1990)). In the context of the present invention, it is to be understood that the porous silicon may be nanoporous silicon (i.e., average pore size <2 nm), mesoporous silicon (i.e., average pore size of 2 nm to 50 nm), or macroporous silicon (i.e., average pore size >50 nm); the pores may also be a series of parallelly aligned acicular or columnar pores that extend into or through the silicon substrate. Although the pores may be angled, they are preferably substantially perpendicular to the surfaces of the substrate.

More specifically, porous silicon electrodes useful in the context of the present invention may be formed by a photoelectrochemical. HF anodic etching technique, wherein selected oxidation-dissolution of silicon occurs under a controlled current density. (See, e.g., Levy-Clement et al., "Porous n-silicon Produced by Photoelectochemical Etching," *Applied Surface Science*, 65/66: 408–414 (1993); M. J. Eddowes, "Photoelectrochemical Etching of Three-Dimensional Structures in Silicon," *J of Electrochem. Soc.*, 137(11):3514–3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes).

In the context of the present invention, an electrode pair assembly adapted for use with a fuel cell system generally comprises: an anode structure derived from a first silicon substrate, an interposing electrolyte, and an opposing cathode structure derived from a second silicon substrate. The anode structure is generally processed so as to have one or more discrete anodic porous active regions disposed across a top surface of the anode, wherein each of the one or more discrete anodic porous active regions is defined by a plurality of anodic acicular pores that extend into or through the anode. Similarly, the cathode structure is generally processed so as to have one or more discrete cathodic active porous regions disposed across a top surface of the cathode, wherein each of the one or more discrete porous cathodic porous active regions is defined by a plurality of cathodic acicular pores that extend into or through the cathode. The opposing anode and cathode structures are generally spaced apart and substantially parallel to each other so as to define a spaced apart region, and the electrolyte is generally interposed between the anodic porous active region and the cathodic porous active region.

In addition, the electrode pair assembly may further comprise a fluid delivery channel disposed across a first face of the anode structure or the cathode structure; and a fluid removal channel disposed across a second face of the anode structure or the cathode structure; wherein at least one of the one or more discrete anodic porous active regions or at least one of the one or more discrete cathodic active porous regions is (i) interposed between the fluid delivery channel and the fluid removal channel, and (ii) adapted to flow a liquid therebetween (e.g., the acicular or columnar pores serve as hydrodynamic transport channels or fluid flow through-holes). In such a configuration, a solid polymer electrolyte (e.g., NAFION, E.I DuPont de Nemours, United States) or a flowing fluid reactant/electrolyte may ionically connect the anode to the cathode. Suitable fluid reactant/electrolytes include, for example, an organic liquid fuel combined with an acid solution (i.e., a liquid aprotic organic electrolyte). Exemplary organic fuels include alcohols such as methanol, ethanol, and propanol, or a combination thereof; and the acid solution may be phosphoric acid, sulfuric acid, or an organic sulfonic acid such as trifluormethanesulfonic acid and its derivatives, or a combination thereof. In some embodiments, the fluid reactant/electrolyte comprises a mixture of methanol and water with an acid, where acid concentration is about 0.5 M to 12 M, and preferably about 4 M. The bonding methods used to assemble individual electrode structures into an electrode pair or stack assembly ensure that interfacing electrode structures are isolated in a manner that provides electrolyte and fuel distribution to the active regions, as well as separation from the oxidant supply. Moreover, the bonding methods disclosed herein allow for the formation of hermetic and water tight seals.

Figure 2B:
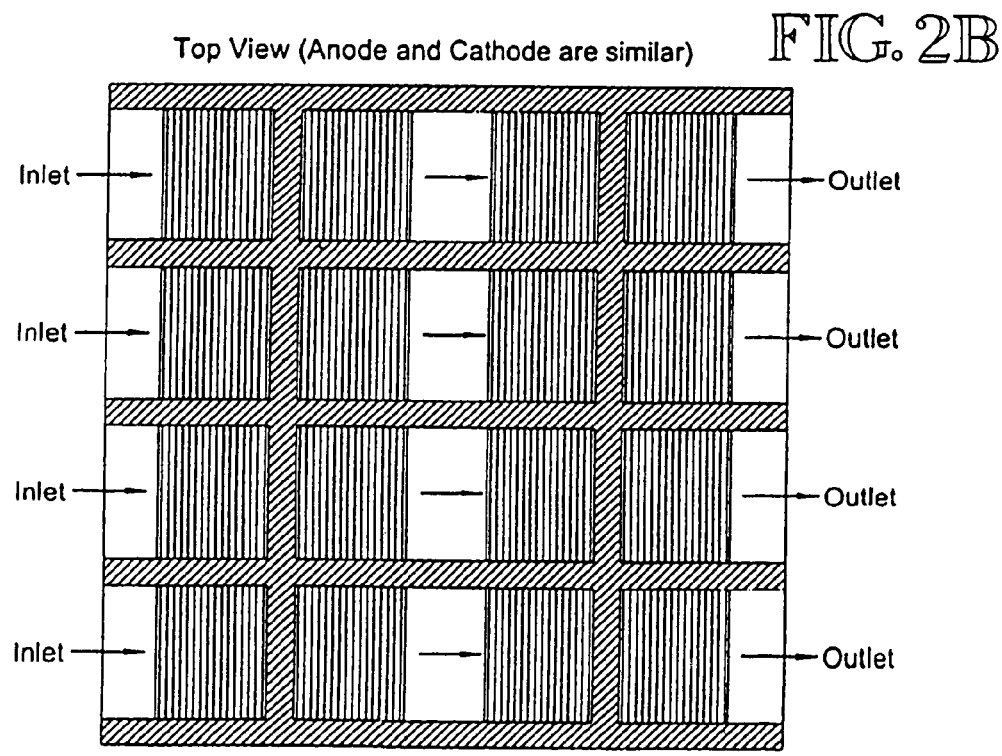
FIG. 2B illustrates a top view of the electrode assembly of FIG. 2A.

Thus, and in accordance with the embodiment represented by FIGS. 2A and 2B, an electrode assembly 700 useful for practicing the present invention comprises a planar anode structure 302 made from a silicon substrate, an electrolyte layer 304, a planar cathode structure 306 made from a silicon substrate, and optionally a blocking layer 308 that is substantially impermeable to at least methanol and is substantially permeable to protons. As shown, the planar anode structure 302 and the planar cathode structure 306 are spaced apart and substantially parallel to each other so as to define a spaced apart region 310, wherein the electrolyte layer 304 and optional blocking layer 308 are interposed between the planar anode structure 302 and the planar cathode structure 306 and within at least a portion of the spaced apart region 310, and wherein the planar anode structure 302 and the planar cathode structure 306 are attached to each other by at least one bridge member 312 that spans across the spaced apart region 310. As depicted, fuel (optionally combined with a liquid electrolyte) flows through the anode and, in some embodiments, through the spaced apart region 310; an oxidant such as, for example, air, oxygen, or a hydrogen peroxide solution simultaneously flows through the cathode. As also shown, the anode structure 302 and the cathode structure 306 each have opposing faces that are conjoined together with at least one selectively positioned bond selected from the group consisting of a silicon-metal eutectic-silicon bond, a silicon-frit-silicon bond, a silicon-metal-silicon microwave bond, a silicon-polymer adhesive-silicon bond.

With respect to electrode pair assemblies having at least one selectively positioned silicon-metal eutectic-silicon bond, it is to be understood that opposing silicon electrode structures may be fusion bonded together by heating and compressing together individual silicon electrode structures having one or more metals deposited thereon at a temperature that is at or above the eutectic point of the silicon-metal binary system (i.e., the silicon substrate and the immediately adjacent metal layer). In this way, the metal component is able to partially diffuse into the underlying crystalline silicon matrix of the opposing silicon fuel cell electrode structure; and upon cooling, the partially commingled and solidified lattice structures of the silicon substrates and adjacent metal layer are understood to be fusion bonded together with a silicon-metal eutectic-silicon bond.

In general, the method for making an electrode pair or stack assembly in accordance with this embodiment of the present invention first involves depositing a dielectric layer on one of the two faces of the opposing silicon electrode structures. The dielectric layer serves two purposes: (1) it prevents electron transport or cross-over between adjacently positioned silicon electrode structures; and (2) it prevents diffusion/migration of the metal component into the silicon electrode structure. In other words, the dielectric layer functions as a barrier layer. As is appreciated by those skilled in the art, suitable dielectrics for these purposes include, for example, silicon oxide, silicon nitride, a polyimide, or a glass. Preferably, however, the dielectric layer is either a deposited or grown (e.g., thermally grown) silicon oxide layer that has a thickness ranging from about 1,000 to 10,000

Angstroms, or a deposited (e.g., LPCVD) silicon nitride layer that has a thickness ranging from about 600 to 1,000 Angstroms.

In order to enhance adhesion of the deposited metal component, the method may optionally comprise depositing an adhesion layer on the dielectric layer of each of the silicon electrode structures (of the electrode pair or stack assembly) so as to form a plurality of silicon electrode structures each having an exposed silicon face and an adhesion face. The adhesion layer may comprise titanium, chromium, tungsten, aluminum, or a combination thereof. Preferably, however, the adhesion layer comprises a deposited (e.g., sputtered) titanium-tungsten alloy layer that has a thickness ranging from about 150 to 1,000 Angstroms, wherein the titanium-tungsten alloy consist essentially of about 5 weight percent titanium and about 95 weight percent tungsten.

Following deposition of the dielectric layers and optional adhesion layers, the method further comprises depositing a metal on at least a portion of the dielectric layer (or adhesion layer) of each of the plurality of silicon electrode structures. As with the dielectric layer, the metal layer also serves two purposes: (1) it allows for fusion bonding between opposing silicon electrode structures; and (2) it optionally allows for electron transport through the stack assembly. As is appreciated by those skilled in the art, suitable metals for these purposes include, for example, gold, tin, lead, copper, silver, aluminum, or a combination thereof. Preferably, however, the metal is deposited (e.g., sputtered) as a gold layer having a thickness ranging from about 0.5 to 5 microns.

Next, the silicon electrode structures are spatially aligned such that the faces of each of the plurality of silicon electrode structures are substantially parallel to one another, and such that the exposed silicon faces are immediately adjacent to the metal (e.g., gold) deposited on the dielectric faces (or adhesion faces). The plurality of silicon electrode structures are then moved together such that they come into contact with one another; heated for first selected period of time and to a temperature that is at or above the eutectic point of the metal/silicon binary system. This assembly is then compressed together with a selected force and for a second selected period of time. Finally, the assembly is allowed to cool such that silicon-metal eutectic-silicon bonds are formed between each of the plurality of silicon electrode structures thereby yielding the electrode pair or stack assembly in accordance with this embodiment of the present invention. As is appreciated by those skilled in the art, there are a number of bonding apparatuses or jigs capable of spatially aligning, moving, heating, and compressing the plurality of silicon electrode structures together.

In addition, and depending on the type of metal deposited and bonding apparatus employed, the following parameters are considered to be typical: the temperature associated with the step of heating the plurality of silicon electrode structures that are in contact with one another generally ranges from about 373° C. to 450° C.; the first selected period of time associated with the step of heating the plurality of silicon electrode structures that are in contact with one another generally ranges from about 1 to 30 minutes; the force associated with the step of compressing the plurality of silicon electrode structures together generally ranges from about 7 to 700 kPa; and the second selected period of time associated with the step of compressing the plurality of silicon electrode structures together generally ranges from about 1 to 15 minutes.

With respect to electrode pair assemblies having at least one selectively positioned silicon-frit-silicon bond, it is to be understood that opposing silicon electrodes structures maybe fusion bonded together by heating and compressing together individual silicon electrode structures (optionally having one or more metals deposited thereon) at a temperature that is at or above the melting point of the frit. As is appreciated by those skilled in the art, a "frit" is a silicate, glassy or glassy-crystalline sintering or fusion product made of a mixture of glass-forming and/or glass affecting materials such as, for example, quartz, feldspar, clays, borax, alkali metal and alkaline earth metal carbonates. In this way, the frit component is able to partially diffuse into the underlying crystalline silicon matrix of the silicon fuel cell electrode structure; and upon cooling, the partially commingled and solidified lattice structures of the silicon substrate and adjacent frit layer are understood to be fusion bonded together with a silicon-frit-silicon bond.

In general, the method for making an electrode pair or stack assembly in accordance with this embodiment involves essentially the same steps as the above-described silicon-metal eutectic-silicon bonding method, except that a frit paste is used in lieu of the metal layer. In this regard, the frit paste is generally deposited by means of screen printing as a layer having a thickness ranging from about 5 to 100 microns. The solvent associated with the frit paste may then be evaporated by placing each pasted electrode structure onto an 80–120° C. hot plate for about 1–15 minutes, thereby yielding a frit layer. The frit layer may then be cured by exposure to $O_2$ at a temperature ranging from about 300–550° C. for about 10–30 minutes. Next, the plurality of silicon electrode structure are spatially aligned such that the faces of each of the plurality of silicon electrode structures are substantially parallel to one another, and such that the exposed silicon faces are immediately adjacent to the deposited frit layer. The plurality of silicon electrode structures are then moved together such that they come into contact with one another; heated for first selected period of time and to a temperature that is at or above the melting point of the frit layer. This assembly is then compressed together with a selected force and for a second selected period of time. Finally, the assembly is allowed to cool such that silicon-frit-silicon bonds are formed between each of the plurality of silicon electrode structures thereby yielding the electrode pair or stack assembly in accordance with this embodiment of the present invention.

With respect to electrode pair assemblies having at least one selectively positioned silicon-metal-silicon microwave bond, it is to be understood that opposing silicon electrode structures may be fusion bonded together by applying microwave energy to adjacently positioned silicon electrode structures having one or more metals deposited thereon. As is appreciated by those skilled in the art, silicon, quartz, certain ceramics and plastics are transparent to microwave energy; and as such, a deposited interposing metal (such as, for example, indium, aluminum, titanium, tin, nickel, gold, or a combination thereof) deposited in between interfacing silicon electrode structures (optionally having an adjoining support member made of silicon, one or more plastics, or one or more glasses) may be selectively heated and melted. In this way, silicon-metal-silicon microwave bonds may be formed to yield an electrode pair or stack assembly in accordance with this embodiment of the present invention.

With respect to electrode pair assemblies having at least one selectively positioned silicon-polymer adhesive-silicon bond or at least one selectively positioned silicon-polymer adhesive-plastic bond, it is to be understood that opposing silicon electrode structures (wherein one of the electrode structures may have an adjoining support member made of plastic or a glass), may be bonded together by compressing together (optionally with heat) individual electrode structures (optionally having one or more metals deposited thereon) that have had a polymer adhesive (I.e., interposing binding material) applied as a coating to at least one of the interfacing electrode structure surfaces. In this regard, the polymer adhesive may be polydimethylsiloxane (PDMS) or benzocyclobutane (BCB); alternatively, the polymer adhesive may be one or more amorphous fluoropolymers such as, for example, TEFLON (DuPont Fluoroproducts, U.S.A.). As is appreciated by those skilled in the art, TEFLON represents a family of amorphous copolymers based on perfluoro (2,2-dimethyl-1,3dioxole) (PPD) with other fluorine-containing monomers. The polymer adhesives of the present invention are generally mixed with a suitable carrier solvent such as, for example, xylene and an optional photoinitiator such as, for example, dimethoxy phenyl acetophenone (DMAP) prior to application.

In general, the method for making an electrode pair or stack assembly in accordance with this embodiment involves spin coating the polymer adhesive with solvent onto at least one of the interfacing electrode structure surfaces. In the case where the polymer adhesive is polydimethylsiloxane (PDMS), the coating may be exposed to ulraviolent (UV) light having an approximate wavelength of about 420 nm by use of standard photolithography techniques. Next, the coating is briefly exposed to $O_2$ plasma. The plasma treated surfaces bond together upon contact with one another at room temperature to thereby yield an electrode pair or stack assembly in accordance with this embodiment of the present invention; namely, electrode pair or stack assemblies having a silicon-polymer adhesive-silicon bond, a silicon-polymer adhesive-plastic bond, or a silicon-polymer adhesive-glass bond.

Finally, and with respect to electrode pairs having at least one selectively positioned silicon-glass anodic bond, it is to be understood that opposing silicon electrode structures (wherein one of the electrode structures has an adjoining support member made of a glass) may be fusion bonded together by anodically bonding together adjacently positioned silicon electrode structures wherein one of the interfacing surfaces is silicon and the other is a glass (e.g., a borosilicate glass). As is appreciated by those skilled in the art, anodic bonding refers to bonding of silicon to silicon or silicon to glass by use of an applied electric field.

Figure 3:
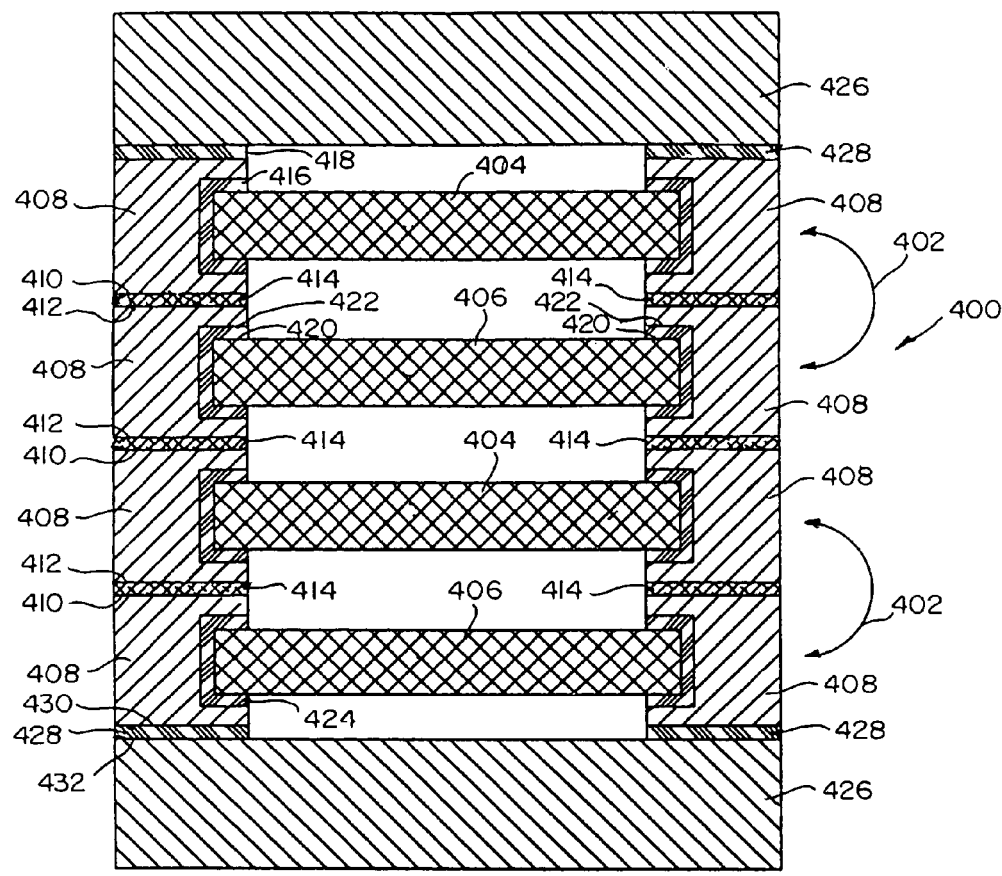
FIG. 3 illustrates a cross-sectional view of an exemplary fuel cell electrode stack assembly in accordance with an embodiment of the present invention.

In view of the foregoing and with reference to FIGS. 3 and 4, a fuel cell electrode stack assembly 400 in accordance with the present invention may be made by bonding together a plurality of electrode pair assemblies 402, wherein each electrode pair assembly 402 comprises an anode structure 404 derived from a first substrate and an opposing cathode structure 406 derived from a second substrate. The first and second substrates are preferably derived from one or more silicon wafers; however, it is to be appreciated that other materials such as porous carbon, raney nickel, and a sol-gel are all possible. As shown in FIG. 3, each anode structure 404 and each cathode structure 406 may have at least one adjoining support member 408 that is made of silicon, one or more of the plastics disclosed herein, or one or more of the glasses disclosed herein. In addition, the at least one adjoining support member 408 of the anode structure 404 and the at least one adjoining support member 408 of the cathode structure 406 may each have interfacing surfaces 410, 412 that are bonded together with a first optional interposing binding material 414 (as disclosed herein) to thereby form a hermetic or water tight seal.

As noted above, the interfacing surfaces 410, 412 between the adjoining support members 408 together with the first optional interposing binding material 414 is understood to include at least one selectively positioned bond selected from the group consisting of a silicon-metal eutectic-silicon bond, a silicon-frit-silicon bond, a silicon-metal-silicon microwave bond, a silicon-polymer adhesive-silicon bond, a silicon-polymer adhesive-plastic bond, a silicon-polymer adhesive-glass bond, or a silicon-glass anodic bond as disclosed herein. Similarly, the interfacing surfaces 416, 418 between the adjoining support members 408 and the anode structure 404, as well as the interfacing surfaces 420, 422 between the adjoining support members 408 and the cathode structure 406, may include, depending on the material of the support members 408 and second optional interposing binding material 424, at least one selectively positioned bond selected from the group consisting of a silicon-metal eutectic-silicon bond, a silicon-frit-silicon bond, a silicon-metal-silicon microwave bond, a silicon-polymer adhesive-silicon bond, a silicon-polymer adhesive-plastic bond, a silicon-polymer adhesive-glass bond, or a silicon-glass anodic bond as disclosed herein.

Finally, the fuel cell electrode stack assembly 400 may also include a pair of end plates 426 bonded together to the plurality of electrode pair assemblies 402 by means of a third optional binding material 428 (as disclosed herein). Each end plate 426 may be made of silicon, one or more of the plastics disclosed herein, or one or more of the glasses disclosed herein. Accordingly, the interfacing surfaces 430, 432 between the pair of end plates 426 and the plurality of electrode pair assemblies 402 may include, depending on the material of the end plates 426 and the third optional interposing binding material 428, at least one selectively positioned bond selected from the group consisting of a silicon-metal eutectic-silicon bond, a silicon-frit-silicon bond, a silicon-metal-silicon microwave bond, a silicon-polymer adhesive-silicon bond, a silicon-polymer adhesive-plastic bond, a silicon-polymer adhesive-glass bond, or a silicon-glass anodic bond as disclosed herein.

For purposes of illustration and not limitation, the following examples more specifically disclose various aspects of the present invention.

EXAMPLES

Examples 1–8 disclose, among other things, general processing steps associated with making electrode stack pairs and assemblies in accordance with certain embodiments of the present invention.

Example 1

Stack Assembly of Silicon Electrode Structures having Au-Si Eutectic Fusion Bonds This example discloses the processing steps associated with making a silicon-based electrode stack assembly adapted for use with a fuel cell system in accordance with an embodiment of the present invention. In this example, the processing steps assume that pre-fabricated anode and cathode silicon electrode structures have been provided, wherein one of the two opposing faces of each electrode structure already has a dielectric layer formed thereon. Accordingly, the processing steps consist essentially of assembling a plurality of electrode structures together to form an electrode pair or stack.

Electrode Stack Assembly Fabrication

Note that the stack configuration can be cathode-anode or cathode-anode-anode-cathode. In either case the terminus is a complete cell.

1.1 Nitride Removal—Use a reactive ion etcher with an $SF_6$ plasma (may use a $CHF_3$ and $O_2$ plasma) to remove nitride from the front and back faces of the electrodes.

1.2 Oxide Removal—Use a reactive ion etcher with a $CHF_3$ and $O_2$ plasma (may use an $SF_6$ plasma) to remove oxide from the surfaces on which an Au-Si eutectic will be formed. The oxide will not be removed from surfaces which will have Au deposited on them.

1.3 Deposit Gold—First deposit a 500 Å Ti layer on the oxide layers in an electron beam evaporator. Then deposit 2 μm Au on top of the Ti in an electron beam evaporator.

1.4 Eutectic Formation—Align the wafers and bring them into contact. Apply pressure in the range of 7 to 700 kPa and heat to 373 to 450° C. for 1 to 10 minutes.

1.5 Dicing—Dice the bonded wafers along the dicing lane to yield single stacks of electrodes.

Example 2

Stack Assembly of Sol-Gel Derived Electrode Structures having Au-Si Eutectic Fusion Bonds This example discloses the processing steps associated with making a sol-gel derived electrode stack assembly adapted for use with a fuel cell system in accordance with an embodiment of the present invention. In this example, the processing steps assume that pre-fabricated anode and cathode sol-gel electrode structures have been provided, wherein one of the two opposing faces of each electrode structure already has a dielectric layer formed thereon. Accordingly, the processing steps consist essentially of assembling a plurality of electrode structures together to form an electrode pair or stack. Without limitation, the principal processing steps are set forth below.

Electrode Stack Assembly Fabrication

Note that the stack configuration can be cathode-anode or cathode-anode-anode-cathode. In either case the terminus is a complete cell.

1.1 Bonding—Align and contact together the wafers and end caps. Heat to 373–450° C. at 7–700 kPa for 1–10 minutes.

1.2 Electrolyte Injection—Introduce NAFION into the electrode stack through the anode and cathode flow channels.

1.3 Dicing—Dice the wafer into separate electrode stacks.

1.4 Solder—Deposit gold solder on the edge of the stack for electrical contact.

Example 3

Thermal Compression Bonding of Electrode Structures with a Frit Paste

This example discloses the processing steps associated with making an electrode pair or stack assembly adapted for use with a fuel cell system in accordance with an embodiment of the present invention. In this example, the processing steps assume that pre-fabricated anode and cathode electrode structures have been provided (silicon-based optionally comprising a sol-gel), wherein one of the two opposing faces of each electrode structure already has a dielectric layer formed thereon. Accordingly, the processing steps consist essentially of assembling a plurality of electrode structures together to form an electrode pair or stack. Without limitation, the principal processing steps are set forth below.

Electrode Stack Assembly Fabrication

Note that the stack configuration can be cathode-anode or cathode-anode-anode-cathode. In either case the terminus is a complete cell. Moreover, the thermal compression bonding aspect generally does not require wafer polishing as the presence of oxide or nitride layers are generally not detrimental to the bond strength.

1.1 Prepare a frit paste (e.g., a mixture of powdered glass, a binder such as ethyl cellulose, and a solvent such as turpineol).

1.2 Screen print the paste onto the bonding faces of each electrode structure so as to yield a 5 to 100 μm thick layer.

1.3 Allow the paste to dry by placing each pasted electrode structure onto an 80–120° C. hot plate for about 1–15 minutes (this step evaporates most of the solvent; hence, the temperature employed depends upon the solvent used in paste).

1.4 Burn off the remaining solvent in a 300–400° C. furnace, 20 minutes.

1.5 Burn off the binder in a 375–425° C. furnace, 20 minutes.

1.6 Melt glass frit in a 350–550° C. furnace, 30 minutes (temperature depends on the type of glass used in the initial frit paste).

1.7 Allow to cool, then bring the glass surfaces into contact with one another.

1.8 Apply 7–700 kPa and fire in 400–850° C. furnace, 30 minutes, thereby yielding the electrode stack assembly.

Example 4

Electrode Pair Structures with a Silicon-Metal-Silicon Microwave Bond

This example discloses the processing steps associated with making an electrode pair or stack assembly adapted for use with a fuel cell system in accordance with an embodiment of the present invention. In this example, the processing steps assume that pre-fabricated anode and cathode electrode structures have been provided (silicon-based optionally comprising a sol-gel), wherein one of the two opposing faces of each electrode structure already has a dielectric layer formed thereon. Accordingly, the processing steps consist essentially of assembling a plurality of electrode structures together to form an electrode pair or stack. Without limitation, the principal processing steps are set forth below.

Note that the stack configuration can be cathode-anode or cathode-anode-anode cathode. In either case the terminus is a complete cell.

1.1 Deposit Gold—Deposit a 500 Å Ti layer then a 1200 Å Au layer on each opposing face of the electrode in an electron beam evaporator.

1.2 Bonding—Align and contact together the wafers and end caps. Place in chamber of a microwave bonder and expose to 2.45 GHz microwaves for 3–30 seconds.

1.3 Dicing—Dice the wafer into separate electrode stacks.

1.4 Solder—Deposit gold solder on the edge of the stack for electrical contact.

Example 5

Electrode Pair Structures with a Silicon-Polymer Adhesive-Silicon Bond

This example discloses the processing steps associated with making an electrode pair or stack assembly adapted for use with a fuel cell system in accordance with an embodiment of the present invention. In this example, the processing steps assume that pre-fabricated anode and cathode electrode structures have been provided (silicon-based optionally comprising a sol-gel), wherein one of the two opposing faces of each electrode structure already has a dielectric layer formed thereon. Accordingly, the processing steps consist essentially of assembling a plurality of electrode structures together to form an electrode pair or stack. Without limitation, the principal processing steps are set forth below.

Note that the stack configuration can be cathode-anode or cathode-anode-anode cathode. In either case the terminus is a complete cell.

1.1 Prepare Polymer Spin-on Solution—Prepare 1 weight % dimethoxy phenyl acetophenone (DMAP) in polydimethylsiloxane (PMDS) spin-on solution.

1.2 Deposit PMDS Film—Using a spin coater at 3000 rpm for 15 to 45 seconds, apply 5 milliliters PMDS spin-on solution to the opposing faces.

1.3 Cure PMDS Film—Expose the PMDS film to ultra-violet light at 420 nanometers wavelength for 5 to 120 seconds.

1.4 Plasma Treatment—Expose the cured PMDS films to $O_2$ plasma at 0.2 Torr and 25 W for 20 seconds in a reactive ion etcher.

1.5 Bonding—Align and contact together the wafers and end caps. Allow to set for 24 hours.

1.6 Dicing—Dice the wafer into separate electrode stacks.

1.7 Solder—Deposit gold solder on the edge of the stack for electrical contact.

Example 6

Electrode Pair Structures with a Silicon-Polymer Adhesive-Plastic Bond

This example discloses the processing steps associated with making an electrode pair or stack assembly adapted for use with a fuel cell system in accordance with an embodiment of the present invention. In this example, the processing steps assume that pre-fabricated anode and cathode electrode structures have been provided (silicon-based optionally comprising a sol-gel), wherein one of the two opposing faces of each electrode structure already has a dielectric layer formed thereon. Accordingly, the processing steps consist essentially of assembling a plurality of electrode structures together to form an electrode pair or stack. Without limitation, the principal processing steps are set forth below.

Note that the stack configuration can be cathode-anode or cathode-anode-anode cathode. In either case the terminus is a complete cell.

1.1 Prepare Polymer Spin-on Solution—Prepare 1 weight % dimethoxy phenyl acetophenone (DMAP) in polydimethylsiloxane (PMDS) spin-on solution.

1.2 Deposit PMDS Film—Using a spin coater at 3000 rpm for 15 to 45 seconds, apply 5 milliliters PMDS spin-on solution to the opposing faces.

1.3 Cure PMDS Film—Expose the PMDS film to ultra-violet light at 420 nanometers wavelength for 5 to 120 seconds.

1.4 Plasma Treatment—Expose the cured PMDS films to $O_2$ plasma at 0.2 Torr and 25 W for 20 seconds in a reactive ion etcher.

1.5 Bonding—Align and contact together the wafers and end caps. Allow to set for 24 hours.

1.6 Dicing—Dice the wafer into separate electrode stacks.

1.7 Solder—Deposit gold solder on the edge of the stack for electrical contact.

Example 7

Electrode Pair Structures with a Silicon-Polymer Adhesive-Glass Bond

This example discloses the processing steps associated with making an electrode pair or stack assembly adapted for use with a fuel cell system in accordance with an embodiment of the present invention. In this example, the processing steps assume that pre-fabricated anode and cathode electrode structures have been provided (silicon-based optionally comprising a sol-gel), wherein one of the two opposing faces of each electrode structure already has a dielectric layer formed thereon. Accordingly, the processing steps consist essentially of assembling a plurality of electrode structures together to form an electrode pair or stack. Without limitation, the principal processing steps are set forth below.

Note that the stack configuration can be cathode-anode or cathode-anode-anode cathode. In either case the terminus is a complete cell.

1.1 Prepare Polymer Spin-on Solution—Prepare 1 weight % dimethoxy phenyl acetophenone (DMAP) in polydimethylsiloxane (PMDS) spin-on solution.

1.2 Deposit PMDS Film—Using a spin coater at 3000 rpm for 15 to 45 seconds, apply 5 milliliters PMDS spin-on solution to the opposing faces.

1.3 Cure PMDS Film—Expose the PMDS film to ultra-violet light at 420 nanometers wavelength for 5 to 120 seconds.

1.4 Plasma Treatment—Expose the cured PMDS films to $O_2$ plasma at 0.2 Torr and 25 W for 20 seconds in a reactive ion etcher.

1.5 Bonding—Align and contact together the wafers and end caps. Allow to set for 24 hours.

1.6 Dicing—Dice the wafer into separate electrode stacks.

1.7 Solder—Deposit gold solder on the edge of the stack for electrical contact.

Example 8

Electrode Pair Structures with a Silicon-Glass Anodic Bond

This example discloses the processing steps associated with making an electrode pair or stack assembly adapted for use with a fuel cell system in accordance with an embodiment of the present invention. In this example, the processing steps assume that pre-fabricated anode and cathode electrode structures have been provided (silicon-based optionally comprising a sol-gel), wherein one of the two opposing faces of each electrode structure already has a dielectric layer formed thereon. Accordingly, the processing steps consist essentially of assembling a plurality of electrode structures together to form an electrode pair or stack. Without limitations the principal processing steps are set forth below.

Note that the stack configuration can be cathode-anode or cathode-anode-anode cathode. In either case the terminus is a complete cell.

1.1 Nitride Removal—Use a reactive ion etcher with an $SF_6$ plasma (may use a $CHF_3$ and $O_2$ plasma) to remove nitride from the front and back faces of the electrodes.

1.2 Oxide Removal—Use a reactive ion etcher with a $CHF_3$ and $O_2$ plasma (may use an $SF_6$ plasma) to remove oxide from the surfaces on which an anodic bond.

1.3 Bonding—Align and contact together one silicon wafer and one borosilicate glass wafer. Place the pair on a planar positive electrode such that the silicon wafer is in contact with the electrode, then place this assembly on a 350–500° C. hot plate. Place a point negative electrode on the borosilicate glass wafer and apply 800–1250 volts for 15 to 30 minutes.

1.4 Dicing—Dice the wafer into separate electrode stacks.

1.5 Solder—Deposit gold solder on the edge of the stack for electrical contact.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

We claim:

1. An electrode pair assembly adapted for use with a fuel cell system, comprising:
   an anode structure made from a first silicon substrate; and
   a cathode structure made from a second silicon substrate, wherein the cathode structure confronts the anode structure;
   the electrode pair assembly being configured such that the cathode structure is bonded to the anode structure with at least one selectively positioned bond, wherein the at least one selectively positioned bond is selected from the group consisting of a silicon-metal eutectic-silicon bond, a silicon-frit-silicon bond, a silicon-metal-silicon microwave bond, a silicon-polymer adhesive-silicon bond, a silicon-polymer adhesive-plastic bond, a silicon-polymer adhesive-glass bond, or a silicon-glass anodic bond.

2. The electrode pair assembly of claim 1 wherein the at least one selectively positioned bond is the silicon-metal eutectic-silicon bond.

3. The electrode pair assembly of claim 1 wherein the at least one selectively positioned bond is the silicon-frit-silicon bond.

4. The electrode pair assembly of claim 1 wherein the at least one selectively positioned bond is the silicon-metal-silicon microwave bond.

5. The electrode pair assembly of claim 1 wherein the at least one selectively positioned bond is the silicon-polymer adhesive-silicon bond.

6. The electrode pair assembly of claim 1 wherein the at least one selectively positioned bond is the silicon-polymer adhesive-plastic bond.

7. The electrode pair assembly of claim 1 wherein the at least one selectively positioned bond is the silicon-polymer adhesive-glass bond.

8. The electrode pair assembly of claim 1 wherein the at least one selectively positioned bond is the silicon-glass anodic bond.

9. The electrode pair assembly of claim 1 wherein the anode structure has at least one porous region.

10. The electrode pair assembly of claim 9 wherein the at least one porous region comprises a plurality of acicular pores.

11. The electrode pair assembly of claim 1 wherein the cathode structure has at least one porous region.

12. The electrode pair assembly of claim 11 wherein the at least one porous region comprises a plurality of acicular pores.

* * * * *